United States Patent [19]

Kimura

[11] Patent Number: 4,934,626
[45] Date of Patent: Jun. 19, 1990

[54] ACCELERATION SENSING DEVICE

[75] Inventor: Junzo Kimura, Shiga, Japan

[73] Assignee: Takata Corporation, Tokyo, Japan

[21] Appl. No.: 361,924

[22] Filed: Jun. 6, 1989

[30] Foreign Application Priority Data

Jun. 7, 1988 [JP] Japan .................. 63-138348

[51] Int. Cl.$^5$ .............................................. B60R 22/40
[52] U.S. Cl. ................................................ 242/107.4 A
[58] Field of Search ................ 242/107.4 A; 280/806;
297/478, 480

[56] References Cited

U.S. PATENT DOCUMENTS 3,770,224 11/1973 Hayashi et al. ............. 242/107.4 A
4,220,294 9/1980 DiPaola ....................... 242/107.4 A
4,729,523 3/1988 Saitou et al. ................ 242/107.4 A Primary Examiner—John M. Jillions
Attorney, Agent, or Firm—Brumbaugh, Graves, Donohue & Raymond

[57] ABSTRACT

An acceleration sensing device comprises a case, an inertial body supported on a base portion of the case, and an actuating pawl pivotably mounted on an upstanding wall portion of the case and having a first arm on one side of its pivot mounting engageable by the inertial body such that the inertial body can move by its inertia in any direction generally horizontally upon an acceleration of the case and upon so moving pivot the pawl to an active position. A blocking member is movably supported by the wall portion of the case at a location below the pivot mounting of the pawl. The blocking member has a hole, the edge of which is engageable by the inertial body upon its movement horizontally in any direction from the stable position so as to move the blocking member horizontally. The pawl has a second arm on the opposite side of the pivot mounting from the first arm, and the second arm of the pawl and the blocking member have protrusions that are engageable with each other when the blocking member is in a blocking position and upon engaging prevent the pawl from pivoting from its inactive position. The blocking member and the case have mutually engaging surfaces to move the blocking member to its blocking position and acting in conjunction with movement of the blocking member by the inertial body when the inertial body moves to its stable position from any other position on the base member.

7 Claims, 7 Drawing Sheets

ACCELERATION SENSING DEVICE

BACKGROUND OF THE INVENTION

Virtually all motor vehicles (cars, trucks, and the like) produced in recent years are equipped with safety belts that wind onto retractors for storage and are unwound for use. The retractors most often used are emergency locking retractors ("ELR"). The ELR type of retractor has a mechanism that normally allows the belt to be unwound when it is in use so that the vehicle occupant can lean forward but locks automatically in the event of a collision or other emergency that could cause the occupant to be thrown forward. Some ELR's are locked by a mechanism that senses rapid rotational acceleration of the belt reel resulting from sudden pulling out of the belt. Others have a mechanism that is actuated by a device that senses acceleration of the vehicle in any direction resulting, for example, from a collision. Some ELR's have both types of locking mechanisms (belt pull-out responsive and vehicle acceleration responsive).

FIGS. 10A and 10B show in simplified form two common types of acceleration sensing devices used in ELR's of the vehicle acceleration-responsive type. Many specific designs for these two types have been devised.

The type shown in FIG. 10A comprises a case 1, the bottom of which has a concave surface (a cone or a spherical segment, for example) in which an inertial body 2 in the form of a ball rests. A pawl 3 normally resides in an inactive position (solid lines) when the ball 2 is in its stable position in the bottom of the concave surface but pivots upwardly (phantom lines 3') and thereby causes the ELR locking mechanism to be actuated whenever the inertial body rolls or slides generally horizontally along the concave surface in any direction. Examples of devices of the type shown in FIG. 1 are found in: U.S. Pat. No. 4,176,809 (1979); French Publ. Pat. Appln. No. 2,396,558 (1979); West German Publ. Pat. Appln. No. 27 14 340 (1978); and West German Publ. Pat. Appln. No. 27 46 091 (1978).

In the acceleration sensing device shown in FIG. 10B an inertial body 5 rests by means of a stem portion 5a in a recess in the bottom of a case 4. A cam follower projection on a pawl 6 rests in a concave surface 5b on the top of the body 5. In the absence of a high acceleration of the case 4, the body 5 rests stably in an upright position, but when the case 4 is accelerated in any direction, the inertia of the body 5 causes the body 5 to tilt in a direction opposite to the direction of the acceleration, whereupon the pawl is pivoted to the active position shown in the phantom lines 6'. Devices of the type of FIG. 10B are described and shown in U.S. Pat. Nos. 4,018,400 (1977); 4,083,512 (1978), and 4,135,410 (1979).

The reliability of known acceleration sensing devices has been well-established by use in many millions of vehicles. There is, however, a problem that has not been solved—in addition to the intended function of initiating locking of the ELR belt reel upon a generally horizontal acceleration, the known devices can initiate locking of the reel upon a generally vertical downward acceleration of the vehicle, a common occurrence on bumpy roads, for example. When the case (1 or 4) is accelerated downwardly, the inertia of the body (2 or 5) causes it to remain stationary vertically, and because the pivot axis of the pawl (3 or 6) also moves down with the case, the pawl is pivoted upwardly and initiates locking of the reel-locking mechanism. Also, the bouncing up and down of the body (2 or 5) in known devices produces a bothersome noise. Some vehicle occupants can become concerned that something is wrong with the retractor mechanism when they hear something loose bouncing around in it.

SUMMARY OF THE INVENTION

An object of the present invention is to prevent the inertial body of an acceleration sensing device from responding to acceleration in directions other than substantially horizontal and thereby prevent unwanted locking of the ELR and prevent bothersome noise. There is provided, according to the present invention, an acceleration sensing device having a case that includes a horizontal base portion and an upstanding wall portion, an inertial body supported on the base portion of the case, and an actuating pawl pivotably mounted on the upstanding wall portion and having a first arm on one side of its pivot mounting engageable by the inertial body. The inertial body, the base portion of the case and the pawl are formed such that the inertial body normally rests in a stable position on the base portion and the pawl resides in an inactive position and such that the inertial body can move by its inertia in any direction generally horizontally in response to acceleration of the case and upon so moving pivot the pawl to an active position. As described thus far, the present invention is well known in a variety of specific designs.

The present invention is characterized in that a blocking member is movably supported by the wall portion of the case at a location below the pivot mounting of the pawl, in that the blocking member has a hole defined by an edge that is engageable by the inertial body upon its movement horizontally in any direction from the stable position so as to move the blocking member horizontally, in that the pawl has a second arm on the opposite side of the pivot mounting from the first arm, in that the second arm of the pawl and the blocking member have protrusions that are engageable with each other when the blocking member is in a blocking position and upon engaging prevent the pawl from pivoting from its inactive position, and in that the blocking member and the case have mutually engaging position-restoring surfaces formed so as to move the blocking member to its blocking position and acting in conjunction with movement of the blocking member by the inertial body when the inertial body moves to its stable position from any other position on the base member.

In preferred embodiments, the acceleration sensing device is further characterized in that said engaging position-restoring surfaces include an inclined surface on the case, such as a surface on the upstanding wall that curves upwardly and outwardly on either side of the blocking member, an inclined surface on a flange portion of the case located on the side of the base portion opposite from the upstanding wall portion or a V-shaped groove. The inclined surface may also be a convex surface of revolution, the axis of which is parallel to a vertical center axis of the inertial mass in its stable position, in which case the engaging surface of the blocking member is the edge of a hole which receives the convex surface of revolution. In preferred embodiments, the blocking member is supported in a slot in the upstanding wall portion of the case.

For a better understanding of the invention, reference may be made to the following description of exemplary

DESCRIPTION OF THE EMBODIMENTS

Figure 1:
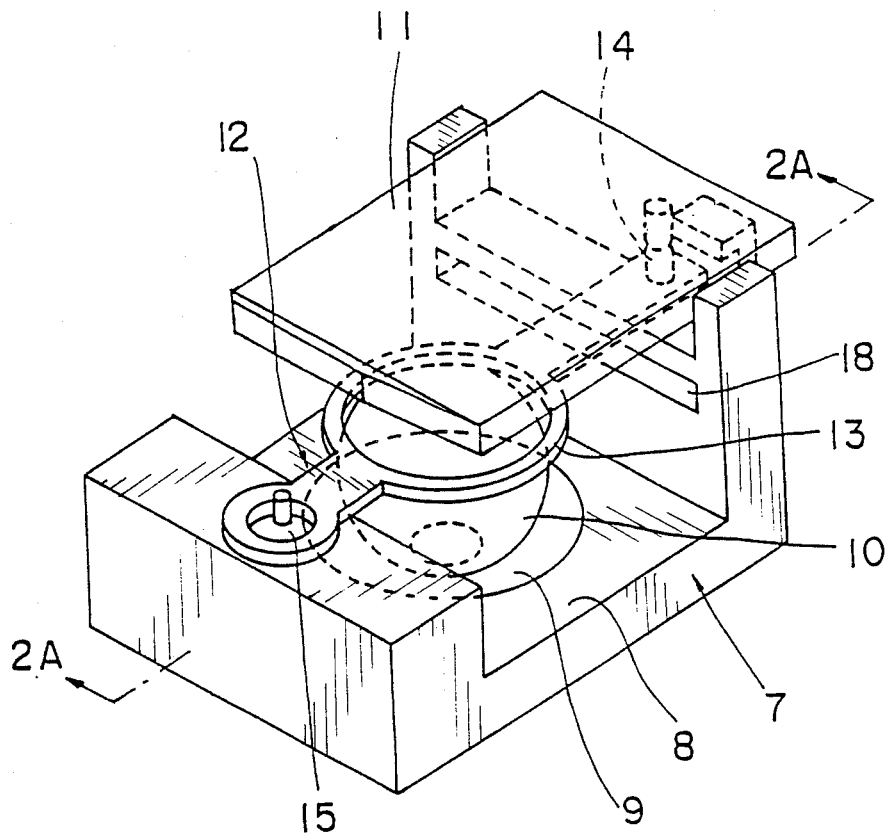
FIG. 1 is a pictorial view of a first embodiment.

Referring first to FIG. 1, the first embodiment comprises a case 7 having a horizontal base portion 8 on which an inertial body 10 is supported. In the absence of rapid acceleration of the case 7 the body 10 resides in the bottom of a shallow concave conical surface 9, but when the case is accelerated rapidly in any direction, the inertial body 10 displaces due to its inertia generally horizontally relative to the case in a direction opposite to the direction of the acceleration. When the body 10 moves along the concave surface 9, it is also moved vertically and engages and lifts up an actuating pawl 11 that is pivotably mounted on the case 7. As is well known in the art, the pawl when lifted engages an element that initiates the operation of a belt reel locking mechanism of an ELR.

A blocking member 12 prevents the inertial body 10 from moving vertically except when it also moves substantially horizontally along the concave surface 9. To this end, it has a hole 13, the edge of which lies closely adjacent the surface of the body 10 at a location some distance below the top of the body. One end portion of the blocking member 12 has a projection 14 that engages a projection on the pawl 11 when the blocking member is in its blocking position, which position is established, when the body 10 is in its stable position in the bottom of the concave surface 9, by correspondence of the location of the blocking member hole 13 with the position of the body 10 and also by engagement of position-restoring surfaces 15 on the case 7 and the blocking member. The blocking member 12 is supported in a slot 18 in the case so that it can displace laterally and is also supported by surfaces of the case that prevent it from being pushed down but allow it to move generally horizontally.

When the blocking member 12 is in the blocking position (correspondence of the hole 13 with the inertial body 10 in its stable position and positioning by the positioning structure 15) and the projection 14 engages the pawl projection, the pawl 11 cannot pivot and keeps the inertial body 10 from moving upwardly vertically in response to generally vertical accelerations. Accordingly, the device cannot initiate operation of the locking mechanism of the ELR in response to generally vertical accelerations.

On the other hand, generally horizontal accelerations of the sensing device produce generally horizontal movements of the inertial body 10, which moves the blocking member 12 (which is free to move horizontally) by engagement of the inertial body 10 with the edge of the hole 13 and thereby disengages the projection 14 from the pawl. The pawl can then pivot, as the inertial body moves generally horizontally and is displaced upwardly by the concave surface 9, and initiate operation of the locking mechanism of the ELR in the usual way.

When the rapid acceleration ceases, the inertial body 10 moves back to its rest position and moves the part of the blocking member 12 with the hole 13 back to the blocking position. The position-restoring surface 15 completes the task of restoring the blocking member to the blocking position, as described in more detail below.

Figures 2A, 2B:
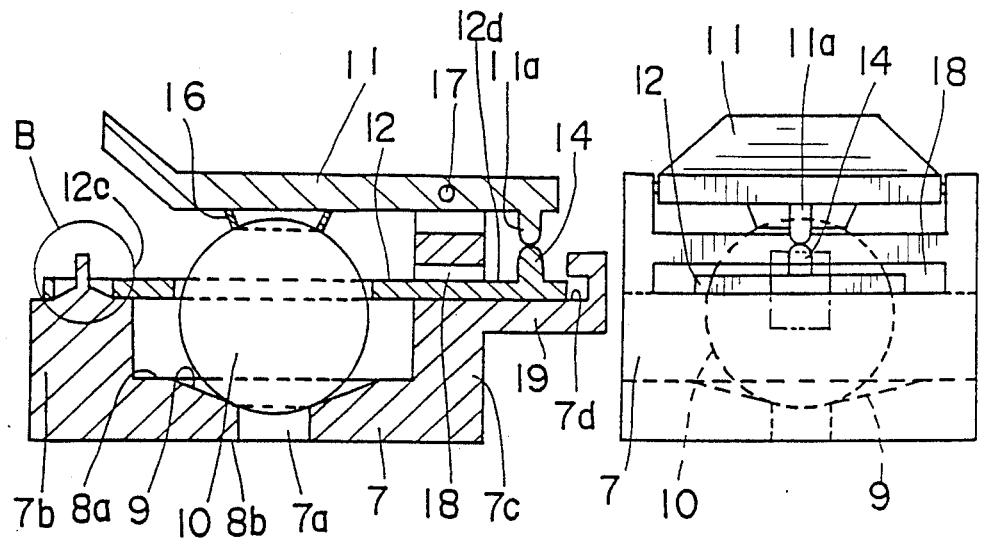
FIG. 2A is a side cross-sectional view of the first embodiment.
FIG. 2B is an end elevational view of the first embodiment.
Figure 2C:
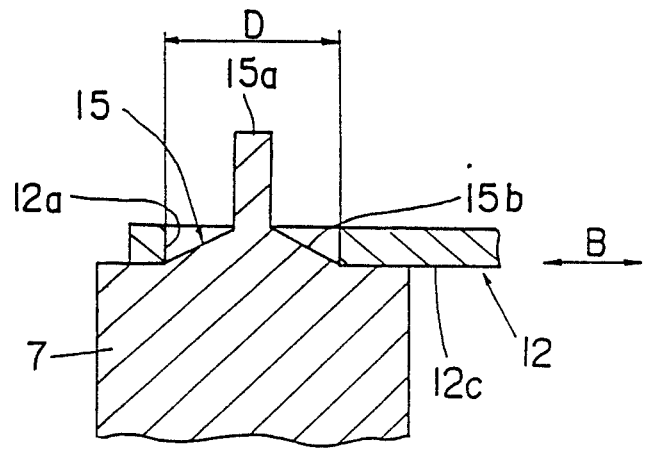
FIG. 2C is a fragmentary detail side cross-sectional view of the portion in the circle B of FIG. 2A on an enlarged scale.

Referring next to FIGS. 2A–2C, the case 7, which is preferably molded from a polymeric material, is generally U-shaped in profile, having a base portion 8, an upstanding wall 7c and a flange 7b. A hole 7a in the center of the concave surface 9 transects the base portion 8 from its upper surface 8a to its lower surface 8b to provide a central seat for the inertial body 10, which in the embodiment is spherical (a ball) and is made of any suitable high density material, such as glass or lead.

Figure 3:
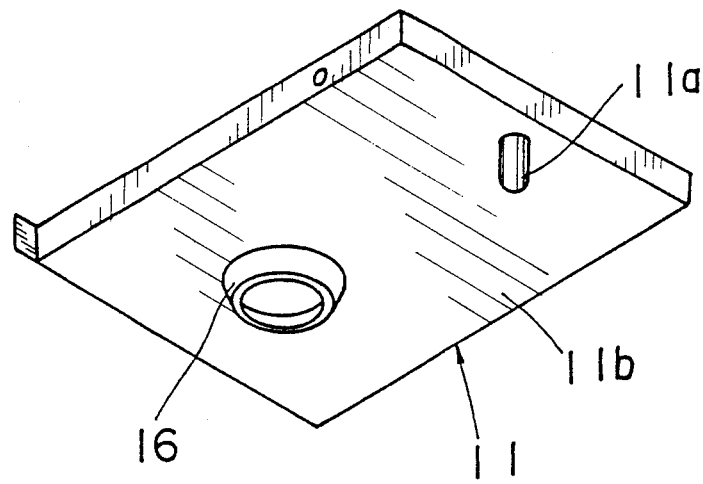
FIG. 3 is a pictorial view of the underside of the actuating pawl of the first embodiment.

The pawl 11 is pivotally attached to the upper part of the case wall portion 7c by a pivot pin 17. On its underside (see FIG. 3) is an annular rib 16 that is engaged by the body 10. The body 10 serves as a moving cam surface, and the rib 16 serves as a cam follower. A projection 11a on the pawl engages the projection 14 on the blocking member 12 and prevents the pawl from pivoting when the blocking member 12 is in its blocking position.

The blocking member 12, which may be molded from a polymeric material, has a ring-like portion defining the hole 13 and a pair of arms 12b and 12c. One arm 12b is received through a slot 18 in the wall portion 7c of the case and is supported on a flange portion 7d that projects out from the wall portion 7c of the case and provides a support structure 19 that resists downward movement of the leg of the pawl 11 on the opposite side of the pivot pin 17 from the working tip and the cam rib 16 when the projections 11a and 14 are in engagement (see FIG. 2A). The other arm 12c of the blocking member has a hole 12a that receives a convex conical projection 15 on the top of the case flange 7b. The hole 12a has the same diameter D as the base of the projection (see FIG. 2C). Extending up from the apex of the projection 15 is a pin 15a, which limits displacement of the arm 12c.

The projection 15 presents an upwardly facing convex conical surface 15, which is a position-restoring surface in that it acts in conjunction with the edge of the hole 12a in the blocking member 12 to restore the blocking member to its blocking position whenever the inertial body is in its stable position in the hole 7a in the case, as described below.

Figure 5A:
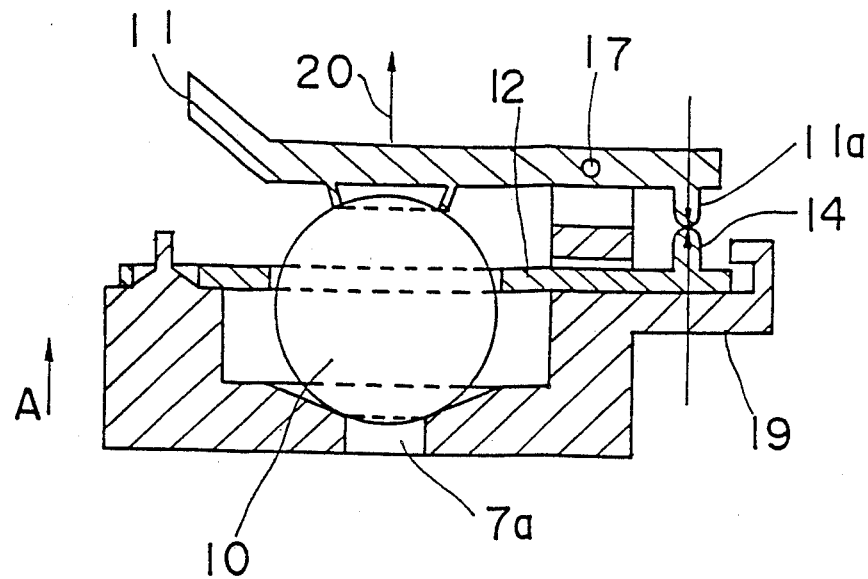
FIGS. 5A and 5B are side cross-sectional views of the first embodiment showing it in its non-actuating and actuating states, respectively.

In the inactive configuration of the device, that is, the configuration it assumes in the absence of rapid acceleration, as shown in FIG. 5A, the inertial body 10 is seated in the hole 7a, and the blocking member 12 is in its blocking position, as established by conformity of the position of the hole 13 with the position of the inertial body and conformity of the edge of the hole 12a with the base of the protrusion 15. If in this position a generally vertically downward acceleration is imposed on the vehicle (i.e., the case 7), an inertial force in the direction A opposes downward movement of the inertial body. However, the projections 11a and 14 engage, and the inertial force on the ball acting upwardly on the pawl, (arrow 20) which acts downwardly on the projection 11a, is resisted by an upward reaction force from the projection 14 and the support structure 19 of the case. Accordingly, the pawl is held in its inactive position.

Figure 4:
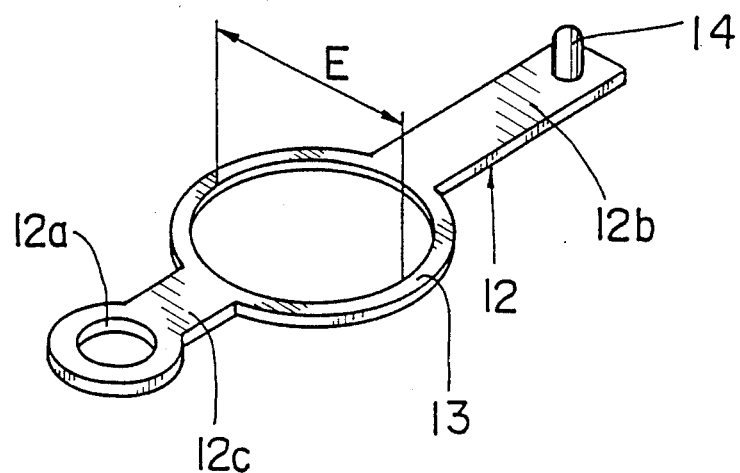
FIG. 4 is a pictorial view of the blocking member of the first embodiment looking from one side and above.
Figure 5B:
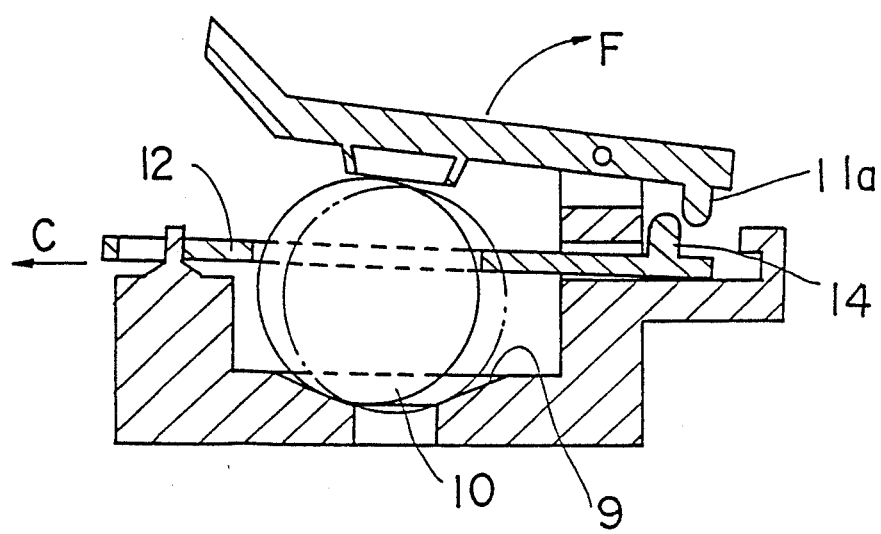

When a rapid acceleration in a generally horizontal direction acts on the case (e.g., from left to right in FIG. 5B), an inertial force in the opposite direction (arrow C) acts on the inertial body 10 and moves it generally horizontally along the concave surface 9. The body 10 engages the edge of the hole 13 and pushes the blocking member 12 to the left, thereby moving the projection 14 on the blocking member out from under the projection 11a on the pawl. The diameter E (FIG. 4.) of the hole is slightly greater than the corresponding diameter of the inertial body to leave clearance for the initial stage of movement of the inertial body 10. The body 10 pushes the working tip end of the pawl 11 upwardly, pivoting it in the direction of the arrow F. The pawl 11 engages an element of the belt-locking mechanism (not shown) of the retractor, causing it to operate, the mechanism prevents the belt from unwinding from the retractor, and the vehicle occupant is restrained from being thrown forward.

Figure 7A:
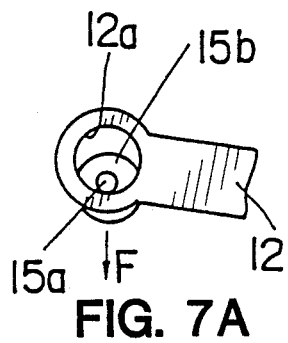
FIGS. 7A and 7B are partial diagrammatic top plan views showing how the blocking member is restored to its blocking position.
Figure 7B:
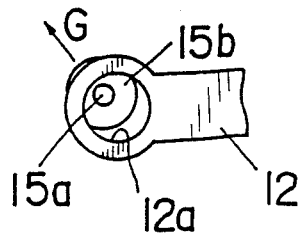
Figure 7C:
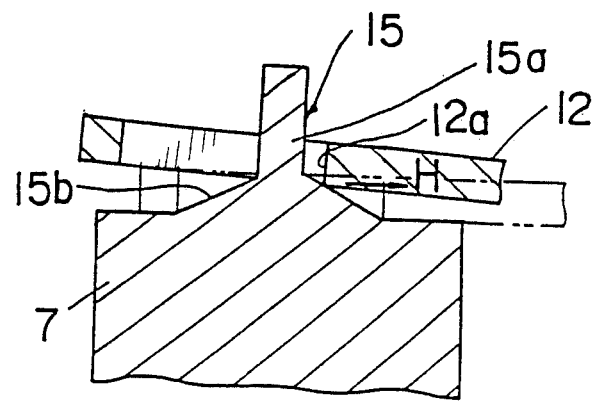
FIG. 7C is a detail partial cross-sectional view, which also shows how the blocking member returns to its blocking position.

After the collision or other emergency has ended, the locking mechanism of the retractor returns to its unlocked state. When the inertial body 10 rolls back to its stable position in the hole 7a, the pawl 11 pivots back to its lowered position (FIG. 5A), and at the same time the body 10 engages the edge of the hole 13 and moves the blocking member 12 to a position in which the center of the hole is coincident with the vertical center axis of the body. When the blocking member 12 was moved by the body 10 away from the blocking position, the hole 12a was displaced along the projection 15 (see FIGS. 5B and 7C). That part of the force due to gravity acting on the pawl 11 and the blocking member 12 at the edge of the hole 12a produces a force component in the direction H (FIG. 7C) that, in conjunction with the force of the body 10 acting at the edge of the hole 13, fully restores the blocking member to the blocking position (FIG. 5A).

Figure 6:
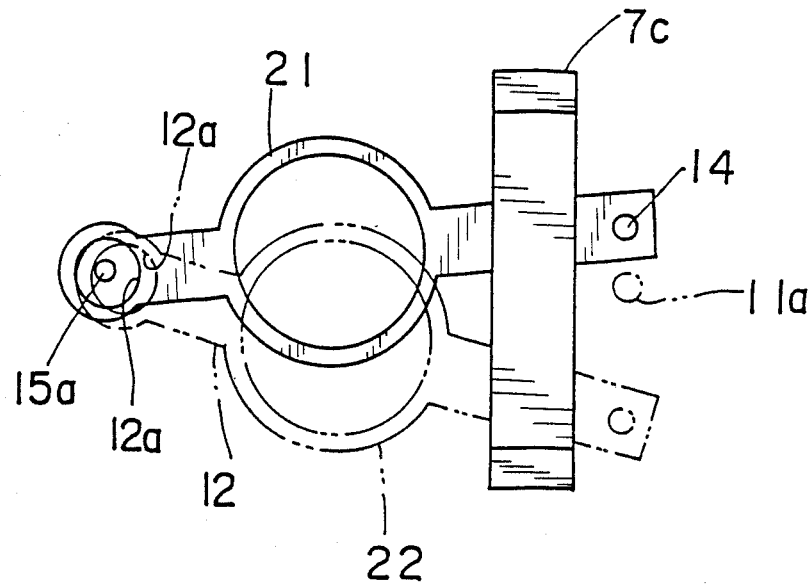
FIG. 6 is a simplified diagrammatic top plan view of the first embodiment showing the blocking member in two exemplary positions when the device is actuated.

The inertial body 10 may displace in any direction relative to the stable position in the bottom of the concave surface 9. In so doing, the body 10 moves the blocking member 12 to any of a virtually infinite number of positions relative to the projection 15. FIG. 6 shows two different positions, one in solid lines 21 and the other in phantom lines 22. From any of such positions, the projection 15 works against the edge of the hole 12a such that the blocking member moves by the force of gravity to center the position-restoring hole 12a at the bottom of the concave position-restoring surface 15b of the projection 15. For example, in FIG. 7A, the blocking member is subject to a camming action by the projection 15 in the direction F, and in FIG. 7B, the restoring force acts in the direction G.

Figure 8:
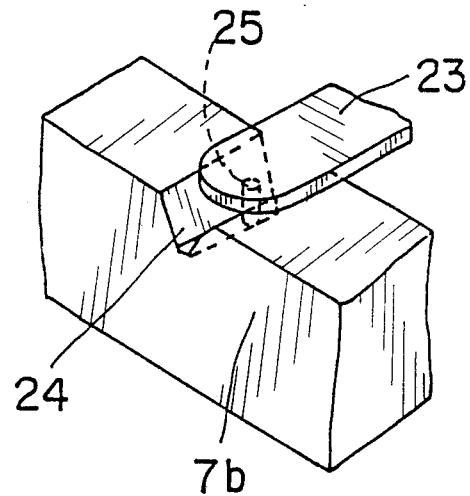
FIG. 8 is a partial pictorial view of a second embodiment of the invention.

FIG. 8 shows an embodiment of the invention in which there is a different arrangement of position-restoring surfaces. The embodiment of FIG. 8 is the same as that of FIGS. 1 to 7 except that the projection 15 is replaced by a generally V-shaped groove 24 in the top of the flange 7b of the case and the blocking member 23 has a pin-like projection 25 that is received in the groove—the blocking member 23 is otherwise the same as the blocking member 12 of the first embodiment. The second embodiment operates in substantially the same way as the first embodiment.

Figure 9:
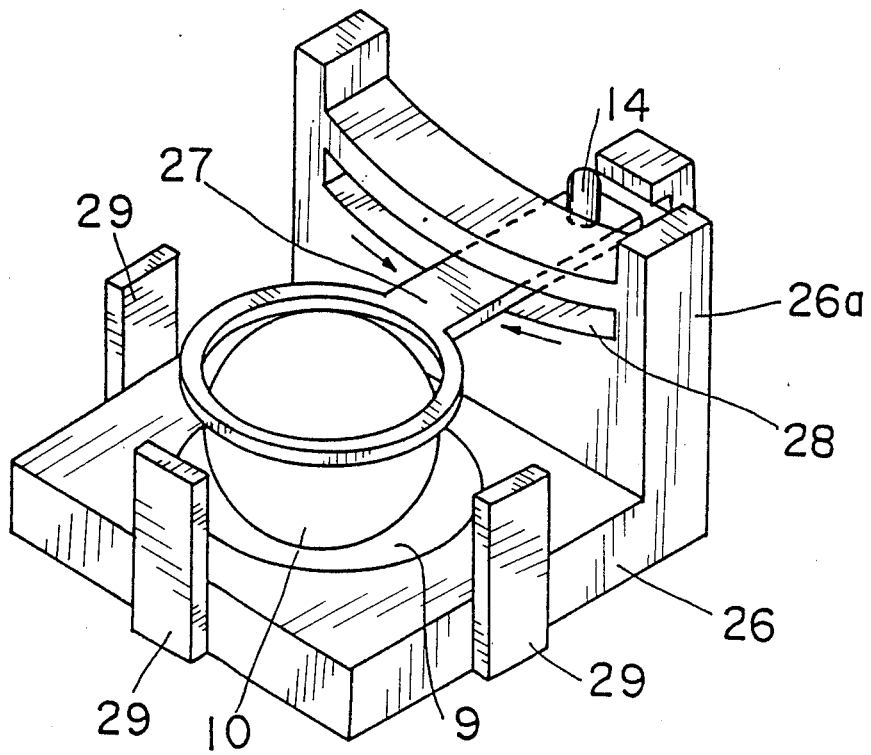
FIG. 9 is a pictorial view of a third embodiment of the invention.

FIG. 9 shows a third embodiment of the invention. This embodiment has a generally L-shaped case 26 having an upstanding wall portion 26a at one end. A spherical inertial body 10 resides in a shallow conical concave surface 9 in the base portion of the case. A blocking member 27 having a ring-shaped portion forming a hole is received through a slot 28 in the wall portion 26a. The relationship of the hole in the blocking member and the inertial body is the same as in the first embodiment. Instead of having position-restoring surfaces on an arm portion extending from the ring portion, the position-restoring surfaces comprise the portion of the leg of the blocking member 27 that extends through the slot 28 and a moderately curved lower surface of the slot 28. The force due to gravity of a portion of the weight of the blocking member 27 and the pawl (not shown in FIG. 9) restores the blocking member 27 to the blocking position—the arm of the blocking member slides down the curved surfaces due to gravity forces in the directions of the arrows, thereby restoring the blocking member to its blocking position in which the projection 14 engages the projection 11a of the pawl 10. Posts 29 extending up from the base portion of the case keep the inertial body 10 from being displaced entirely from the case in any direction.

Figure 10A:
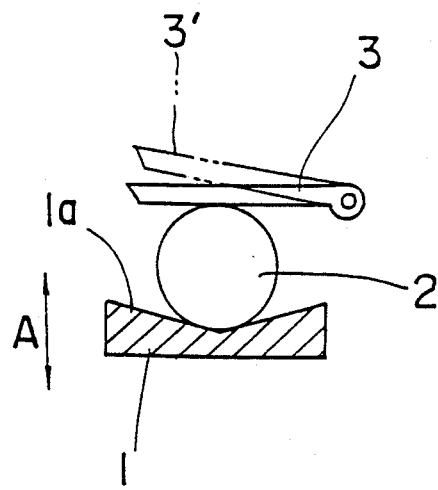
FIGS. 10A and 10B are diagrammatic side views of two types of prior art acceleration sensing devices, as described above.
Figure 10B:
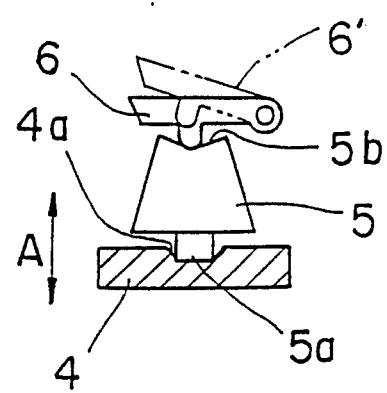

The above-described embodiments of the invention are merely exemplary, and various modifications will be apparent to those skilled in the art. For example, instead of an inertial body in the form of a sphere, the inertial body may be a falling weight similar to that shown in FIG. 10B or the various inertial bodies shown in the prior art. When the falling weight tips from its upright stable position, it will move the blocking member from the blocking position in the same way as the spherical body 10 moves the blocking member. Also, the circular holes 13 and 12a in the blocking member can be replaced by polygonal holes presenting an edge that will be engaged by the inertial body in any direction that the inertial body moves from its stable position.

I claim:

1. An acceleration sensing device having a case that includes a horizontal base portion and an upstanding wall portion, an inertial body supported on the base portion of the case, and an actuating pawl pivotably mounted on the upstanding wall portion and having a first arm on one side of its pivot mounting engageable by the inertial body, the inertial body, the base portion of the case and the pawl being formed such that the inertial body normally rests in a stable position on the base portion and the pawl resides in an inactive position and such that the inertial body can move by its inertia in any direction relative to the case generally horizontally in response to acceleration of the case and upon so moving pivot the pawl to an active position, characterized in that a blocking member is movably supported by the wall portion of the case at a location below the pivot mounting of the pawl, in that the blocking member has a hole defined by an edge that is engageable by the inertial body upon its movement horizontally in any direction from the stable position so as to move the blocking member substantially horizontally, in that the pawl has a second arm on the opposite side of the pivot mounting from the first arm, in that the second arm of the pawl and the blocking member have protrusions that are engageable with each other when the blocking member is in a blocking position and upon engaging prevent the pawl from pivoting from its inactive position, and in that the blocking member and the case have mutually engaging position-restoring surfaces formed to restore the blocking member to its blocking position and acting in conjunction with movement of the blocking member by the inertial body when the inertial body moves to its stable position from any other position on the base member.

2. An acceleration sensing device according to claim 1 and further characterized in that said mutually engaging surfaces include an inclined surface on the case.

3. An acceleration sensing device according to claim 2 and further characterized in that the inclined surface is a surface on the upstanding wall that curves upwardly and outwardly on either side of the blocking member.

4. An acceleration sensing device according to claim 2 wherein the inclined surface is on a flange portion of the case located on the side of the base portion opposite from the upstanding wall portion.

5. An acceleration sensing device according to claim 4 and further characterized in that the inclined surface is a V-shaped groove and in that the engaging surface of the blocking member is a projection.

6. An acceleration sensing device according to claim 4 and further characterized in that the inclined surface is a convex conical surface of a conical projection, the axis of which is parallel to a vertical center axis of the inertial mass in its stable position, and in that the engaging surface of the blocking member is the edge of a hole which receives the conical projection and has transverse dimensions substantially equal to the transverse dimension of the base of the conical projection.

7. An acceleration sensing device according to claim 1 and further characterized in that the blocking member is supported in a slot in the upstanding wall portion of the case.

* * * * *